UNITED STATES PATENT OFFICE.

CHARLES ANGUS CLEGHORN, OF WOBURN SANDS, ENGLAND.

MATERIAL OR THE PROCESS OF PRODUCING MATERIALS FOR COATING SUBSTANCES TO PROTECT THEM OR RENDER THEM NON-POROUS.

1,396,023. Specification of Letters Patent. Patented Nov. 8, 1921.

No Drawing. Application filed December 30, 1919. Serial No. 348,473.

*To all whom it may concern:*

Be it known that I, CHARLES ANGUS CLEGHORN, subject of the King of England, residing at Woburn Sands, in the county of Bedford, England, have invented certain new and useful Improvements in Materials or the Processes of Producing Materials for Coating Substances to Protect Them or Render Them Non-Porous, of which the following is a specification.

This invention is for improvements in or relating to materials, or the process of producing materials for coating substances to protect them or render them non-porous, and has for its object to provide means whereby the material known as "Turkish birdlime", or some similar substance prepared from the fruits of the trees of the Cordiaceæ known botanically as "Cordia myxa" and "Cordia latifolia", may be brought to a condition enabling it to be easily applied to the surfaces of substances without its properties being detrimentally changed.

"Turkish birdlime" as imported into this country is too thick to enable it to be readily handled, say, to pack it into a joint, or to be readily spread; it would be quite impossible to apply it, for example, with a brush. If it could be easily spread it could be applied in a thin coating to canvas or other materials to render them proof against certain fluids such as petrol and it would then be especially useful for manufacturing petrol-tanks of porous materials, such as canvas, or materials which are attacked by petrol, such as rubber, or for rendering fabrics for balloons or gas-masks impervious to noxious or other gases. Moreover, if the material could be easily introduced into confined spaces, it could be employed for packing joints, say, in petrol-conduits, whereas in its crude form it is so stringy that it is unmanageable for this purpose.

According to the primary feature of the present invention there is provided a process of treating "Turkish birdlime" to bring it into working condition which consists in drying the birdlime (preferably in a vacuum) at a temperature not exceeding 180° F., and then pulverizing it. Conveniently the pulverizing of the birdlime is effected while it is maintained at a temperature not exceeding 180° F.

According to another feature of the invention there is provided a method of making fluid-tight joints which consists in packing dry pulverized birdlime prepared as aforesaid between the surfaces to be joined and then adding liquid (for example water either alone or with alcohol or acetone) to the birdlime or exposing the latter to the action of moisture or water or other vapor.

According to a further feature of the invention there is provided a process of treating "Turkish birdlime" to bring it into working condition which consists in drying and pulverizing it as aforesaid and then adding to it liquid (for example water, either alone or with alcohol or acetone) sufficient to bring it to such a condition that it can be painted or spread on any surface it is desired to cover with it, or used as a jointing material.

According to another feature of the invention there is provided a method of covering a surface with "Turkish birdlime" which consists in dusting or otherwise applying to the surface a layer of any desired thickness of dry pulverized birdlime prepared as aforesaid and then exposing it to the action of moisture or water or other vapor or otherwise adding liquid to it. This will bring the powdered birdlime back to its normal condition thereby providing a coating of any desired thickness without the time and trouble involved in the application of several thin coats which would otherwise be necessary.

After the birdlime has been dried it is pulverized preferably while it is maintained at a temperature not exceeding 180° F, to prevent moisture from having an adverse effect upon the birdlime. The pulverizing may be effected in a hot chamber or between heated rolls.

When thus pulverized, it can be readily thinned by mixing it with hot water whereof the temperature again must not exceed 180° F, or with any other liquid which will give the required consistency without detrimentally changing its character, for example, water with alcohol or acetone may be used to bring the pulverized material to such a condition that it can be painted or spread on to any surface it is desired to cover with it.

While still in powder form, rubber or other substances can be added to it when required, say by mechanical mixing at a suitable temperature.

The dried pulverized birdlime provides an excellent composition for packing joints, especially where the joint is to resist the passage of certain fluids which are particularly mobile as is petrol, or which are active substances and thus liable to destroy the packing material used. For packing, say, a petrol-conduit, the dry pulverized birdlime can be easily packed around the ends to be connected and then the liquid which is to make it bind together, added. The parts of the union or other securing-means may then be applied and the joint will be found to be sound, and one which is not easily damaged by vibration. Instead of adding liquid to the powder the latter may be exposed simply to the moisture in the atmosphere or to water or other vapor, and on absorbing moisture will be found to swell and make a tight joint.

Another method of jointing material consists in applying to the surfaces to be joined a coating of liquid consisting of powdered birdlime as aforesaid brought to the required consistency by the addition of water, alcohol, acetone or other suitable agent.

The invention also provides a means of rapidly applying to a sheet of material a thick coating of the birdlime since obviously the powder can be mixed into a liquid of any desired consistency or can be dusted on dry of any desired thickness and then allowed to absorb moisture, whereas in other processes a coating of the desired thickness can only be obtained by the repeated application of a number of thin coats dried down independently.

The dried and pulverized powder could be packed in a dry atmosphere in air-tight tins or other containers for transport purposes.

What I claim as my invention and desire to secure by Letters Patent is:—

1. A process of treating "Turkish birdlime" to bring it into working condition which consists in drying the birdlime at a temperature not exceeding 180° F. and then pulverizing it.

2. A process of treating "Turkish birdlime" to bring it into working condition which consists in drying the birdlime in a vacuum at a temperature not exceeding 180° F. and then pulverizing it.

3. A process of treating "Turkish birdlime" to bring it into working condition which consists in drying the birdlime at a temperature not exceeding 180° F. and then pulverizing it while maintaining it at a temperature not exceeding 180° F.

4. A process of treating "Turkish birdlime" to bring it into working condition which consists in drying the birdlime in a vacuum at a temperature not exceeding 180° F. and then pulverizing it while maintaining it at a temperature not exceeding 180° F.

5. A process of treating "Turkish birdlime" to bring it into working condition which consists in drying the birdlime at a temperature not exceeding 180° F., pulverizing it, and then adding to it liquid sufficient to bring it to such a condition that it can be applied to any surface it is desired to cover with it.

6. A process of treating "Turkish birdlime" to bring it into working condition which consists in drying the birdlime at a temperature not exceeding 180° F., pulverizing it, and then adding to it liquid sufficient to bring it to such a condition that it can be spread onto any surface it is desired to cover with it.

7. A process of treating "Turkish birdlime" to bring it into working condition which consists in drying the birdlime at a temperature not exceeding 180° F., pulverizing it, and then adding to it liquid including water sufficient to bring it to such a condition that it can be applied to any surface it is desired to cover with it.

8. A process of treating "Turkish birdlime" to bring it into working condition which consists in drying the birdlime at a temperature not exceeding 180° F., pulverizing it, and then adding to it liquid including water and alcohol sufficient to bring it to such a condition that it can be applied to any surface it is desired to cover with it.

9. A process of treating "Turkish birdlime" to bring it into working condition which consists in drying the birdlime at a temperature not exceeding 180° F., pulverizing it, and then adding to it water sufficient to bring it to such a condition that it can be applied to any surface it is desired to cover with it.

10. A process of treating "Turkish birdlime" to bring it into working condition which consists in drying the birdlime at a temperature not exceeding 180° F., pulverizing it, and then adding to it water and alcohol sufficient to bring it to such a condition that it can be applied to any surface it is desired to cover with it.

11. A process of treating "Turkish birdlime" to bring it into working condition which consists in drying the birdlime at a temperature not exceeding 180° F., pulverizing it, and then exposing a layer of the pulverized material to the action of liquid.

12. A process of treating "Turkish birdlime" to bring it into working condition which consists in drying the birdlime at a temperature not exceeding 180° F., pulverizing it, and exposing a layer of the pulverized material to the action of water.

13. A process of treating "Turkish birdlime" to bring it into working condition which consists in drying the birdlime at a temperature not exceeding 180° F., pulverizing it, and exposing a layer of the pulverized material to the action of water vapor.

14. As an article of manufacture, "Turkish birdlime" prepared by drying it at a temperature not exceeding 180° F. and then pulverizing it.

15. As an article of manufacture, "Turkish birdlime" prepared by drying it in a vacuum at a temperature not exceeding 180° F. and then pulverizing it.

16. As an article of manufacture, "Turkish birdlime" prepared by drying it at a temperature not exceeding 180° F. and then pulverizing it while maintaining it at a temperature not exceeding 180° F.

17. As an article of manufacture, "Turkish birdlime" prepared by drying it at a temperature not exceeding 180° F., pulverizing it and adding to it liquid sufficient to bring it to such a condition that it can be applied to any surface it is desired to cover with it.

In testimony whereof I affix my signature.

CHARLES ANGUS CLEGHORN.